E. W. BURGESS.
COMBINED HAY RAKE AND COCKER.
APPLICATION FILED MAY 1, 1916.
1,331,482.
Patented Feb. 24, 1920.
3 SHEETS—SHEET 1.
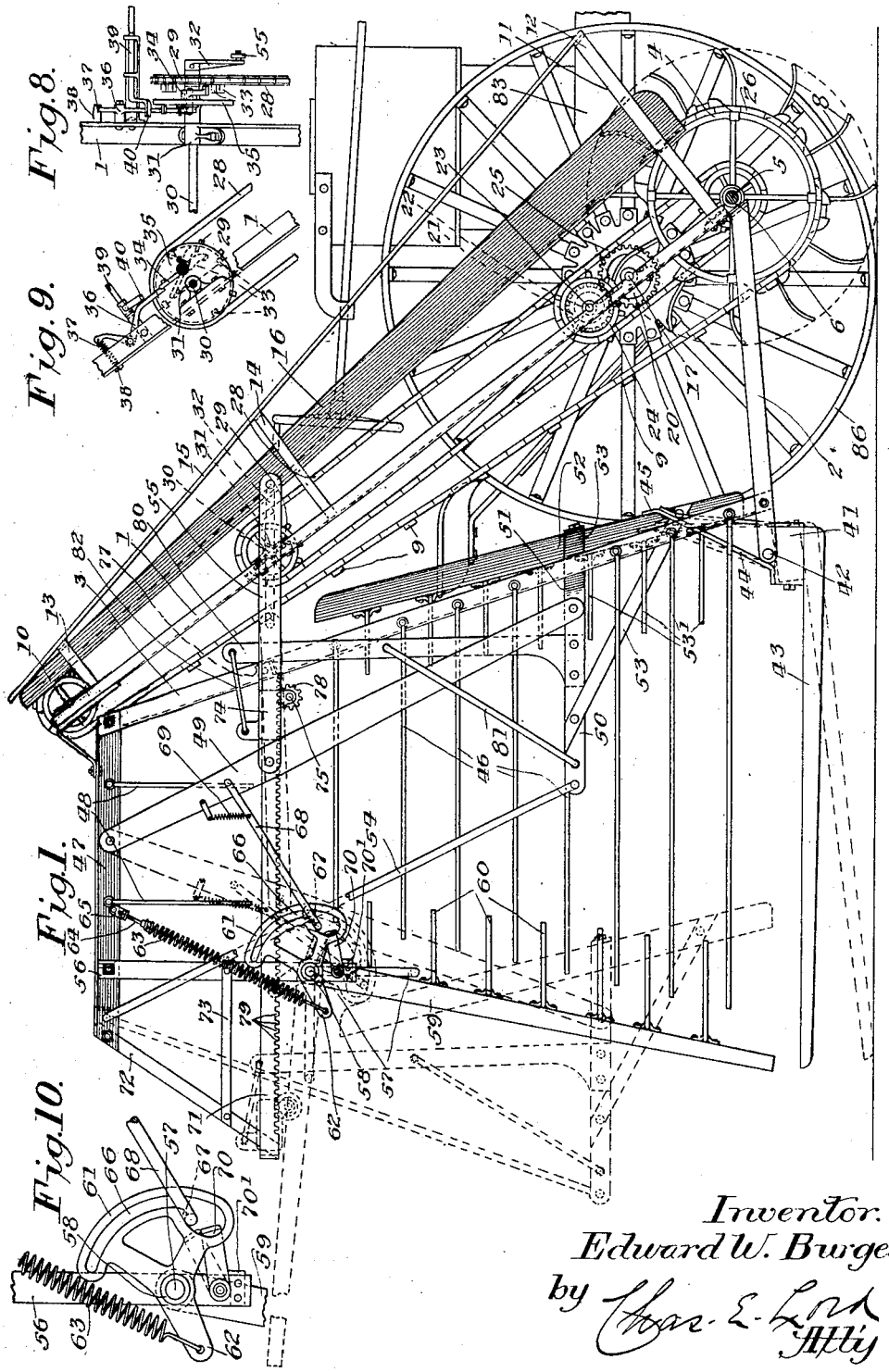
Inventor.
Edward W. Burgess,
by Chas. E. Lord
Atty

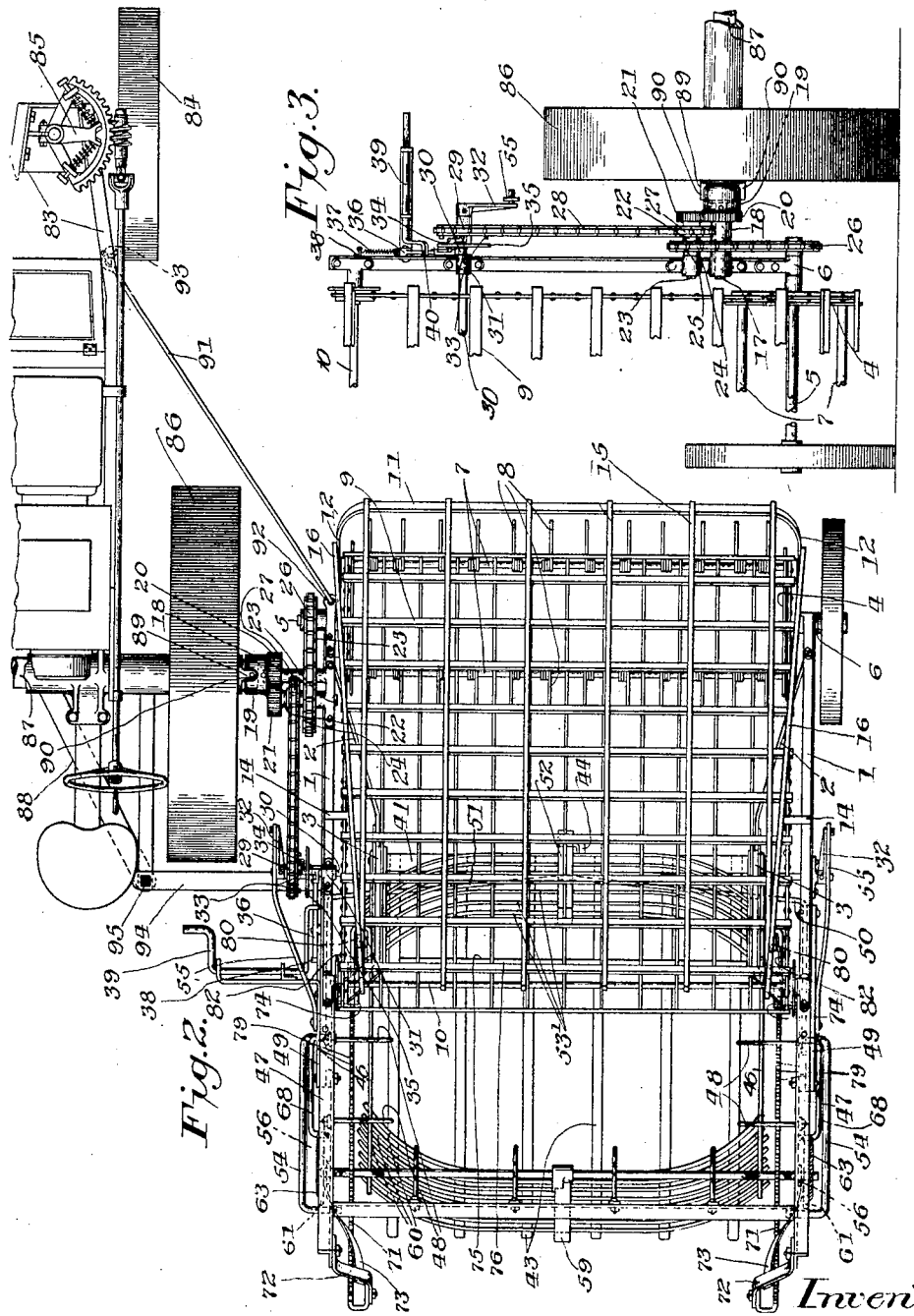

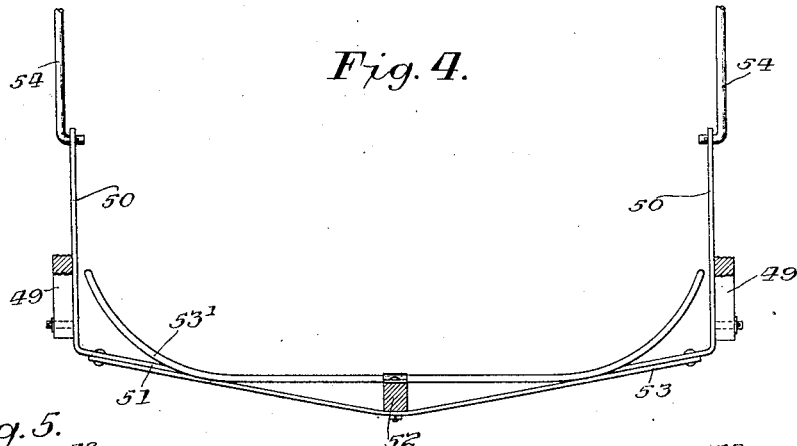
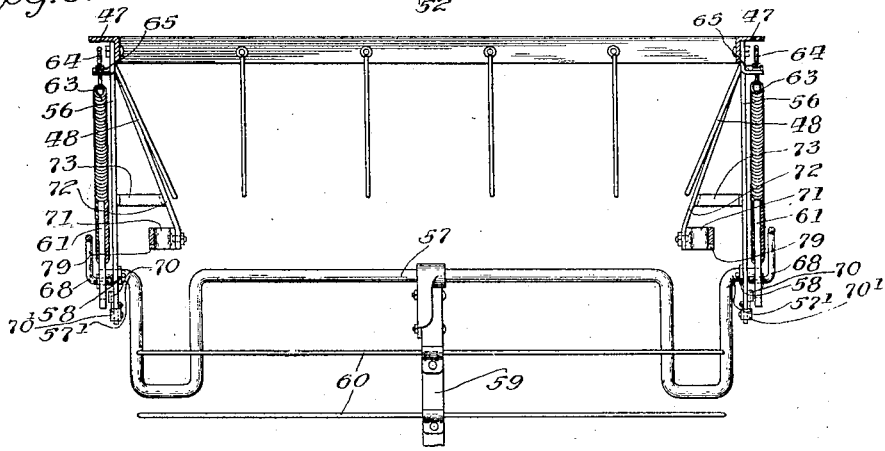
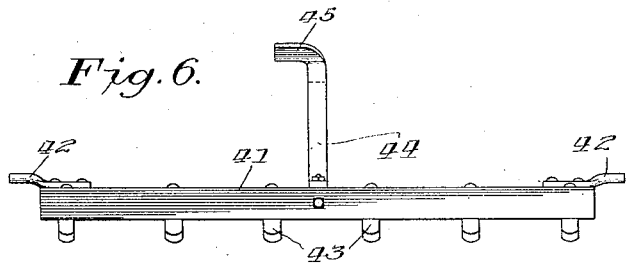

UNITED STATES PATENT OFFICE.

EDWARD W. BURGESS, OF CHICAGO, ILLINOIS, ASSIGNOR, BY MESNE ASSIGNMENTS, TO INTERNATIONAL HARVESTER COMPANY, A CORPORATION OF NEW JERSEY.

COMBINED HAY RAKE AND COCKER.

1,331,482.          Specification of Letters Patent.       Patented Feb. 24, 1920.

Application filed May 1, 1916. Serial No. 94,745.

*To all whom it may concern:*

Be it known that I, EDWARD W. BURGESS, a citizen of the United States, residing at Chicago, in the county of Cook and State of Illinois, have invented certain new and useful Improvements in Combined Hay Rakes and Cockers, of which the following is a full, clear, and exact specification.

My invention relates to combined hay rakes and cockers, and comprises means for raking hay or grain from a swath or windrow and elevating and delivering it to a chute having downwardly converging walls whereby the material is directed into the open upper end of a conical cage provided with a tilting hinged bottom, and means controllable by the operator for ejecting a cock from the cage when it has been filled; the machine being adapted to be used with a tractor and having its operative parts connected with a moving part thereof.

The object of the invention is to provide means whereby a single operator may control the tractor and the rake and cocker while it is operating continuously in forming and ejecting the finished cocks.

This object is attained by means of the mechanism illustrated in the accompanying drawings and described in the specification.

In the drawings—

Figure 1 is a side elevation of a rake and cocker and part of a tractor embodying my invention;

Fig. 2 is a top plan view of Fig. 1;

Fig. 3 is a vertical elevation of part of the structure designed to show the manner of supporting and connecting it with the axle of the tractor;

Fig. 4 is a sectional plan view of part of the cock ejecting mechanism;

Fig. 5 is a detail of the rear end of the receiving chute and part of the swinging rear side of the receiving cage and its controlling mechanism;

Fig. 6 is an end elevation of the tilting bottom forming a part of the receiving cage;

Fig. 7 is a sectional detail of part of an apron carrier disposed between the lower end of the receiving chute and the mouth of the cage as shown in Fig. 1.

Fig. 8 is a detail view of the clutch and trip mechanism for the cock ejector;

Fig. 9 is a similar view taken at right angles to Fig. 8; and,

Fig. 10 is a detail view on an enlarged scale of the releasing latch for the rear wall of the cock former.

The same reference characters designate like parts throughout the several views.

The rake and elevator carrier include upwardly and rearwardly inclined side frame members 1 upon opposite sides of the machine, 2 horizontally disposed frame members having their front ends secured to the lower ends of the members 1 and their rear ends to the lower ends of inclined side frame members 3, having their upper ends secured to the upper ends of the members 1, 4 a raking cylinder having an axle 5 journaled in bearings 6 secured to the frame members 1 and 2 and tooth carrying bars 7, having resilient teeth 8 mounted thereon, 9 a common form of endless slatted carrier driven by the cylinder and having its upper end carried by a shaft 10 journaled upon the upper delivery end of the frame of the elevator, 11 a transversely disposed U-shaped frame member having the lower ends of its side members 12 secured to the lower ends of the side frame members 1, 13 a second U-shaped frame member disposed across the upper end of the elevator, and 14 a like frame member disposed across its middle, 15 a series of pressure bars spaced apart laterally and carried by the U-shaped members, 16 side rails secured to the sides of the U-shaped members adjacent the sides of the endless carrier, 17 a laterally extending stub shaft secured to the side frame member 1 and having journaled thereon a sleeve 18 provided with a clutch fork 19 upon its outer end, 20 a spur gear member integral with the sleeve 18 and meshing with a corresponding gear member 21 integral with a sleeve member 22 journaled upon a second stub shaft 23 secured to the side frame member 1, and integral with the sleeve at its inner end is a sprocket wheel 24 that receives a sprocket chain 25 whereby it is operatively connected with a sprocket wheel 26 secured to the axle 5 of the raking cylinder, 27 a third sprocket wheel integral with the sleeve member 22 and receiving a sprocket chain 28 whereby it is operatively connected with a fourth sprocket wheel 29 journaled upon a transversely disposed shaft 30 journaled in bearing members 31 secured to the side members 1 of the elevator frame and provided with crank arms 32 at its opposite ends.

Means are provided whereby the sprocket wheel 29 may be intermittently clutched with the shaft 30 in a manner to cause the shaft to rotate therewith, said means including clutch teeth 33 carried by the sprocket wheel and adapted to engage with a pawl member 34 pivotally mounted upon a disk 35 secured to the shaft 30 and normally held disengaged from the clutch teeth by means of a trip stop 36 pivotally mounted upon the frame and normally held within the path of movement of the pawl by means of a tension spring 37, having one end connected with the trip stop and its opposite end with a clip member 38 secured to the side frame member 1, and 39 represents a laterally extending clutch tripping rock shaft connected with the trip stop and having an arm 40 thereon whereby the clutch tripping mechanism may be manipulated.

The cock former includes a tiltable bottom comprising a transversely disposed head 41, having trunnion members 42 secured to its opposite ends whereby the head is pivotally connected with the rear ends of the horizontally disposed members 2 of the elevator frame, 43 a series of laterally spaced rearwardly extending fingers having their front ends secured to the head, and 44 a vertically disposed bracket member secured to the middle of the head and provided with a laterally extending arm 45 at its upper end. 46 represents a series of longitudinally disposed rods spaced apart vertically, having their front ends secured to the inclined frame members 3 of the elevator frame and forming the side walls of the cock former, 47 rearwardly extending horizontally disposed frame members having their front ends secured to the upper ends of the frame members 3 at the delivery end of the elevator, and 48 a series of depending converging fingers secured to the frame members 47 and forming the side walls of the receiving chute. 49 represents swinging pendulum levers disposed upon opposite sides of the cock former, having their upper ends pivotally connected to the bars 47 and their lower ends to the rearwardly extending arms 50 of a U-shaped movable cock ejecting member, having secured to the middle of its head 51 an upwardly and rearwardly inclined bar 52, and 53 represents a truss member connecting the opposite ends of the head 51 with the bar 52. Secured to the bar 52 are a series of rearwardly curved rods $53^1$, spaced apart vertically and forming a rear movable wall of the cock former. 54 represents links disposed parallel with the swinging levers 49, having their upper ends pivotally connected with the rear ends of the bars 47 and their lower ends to the rear ends of the arms 50, and 55 pitmen operatively connecting the crank arms 32 with the swinging levers 49. 56 represents depending frame members having their upper ends secured to the frame members 47, 57 a transverse shaft having bearings members $57^1$ at its opposite ends that are journaled in bearings 58 of frame members 56, 59 a depending arm having its upper end secured to the middle of the shaft, and 60 forwardly curved fingers spaced apart vertically, secured to the arm and forming a swinging rear wall of the cock former. Secured to opposite ends of the rock shaft 57 are sector members 61 provided with rearwardly extending arms 62, having their free ends connected with the lower ends of tension springs 63 that have their upper ends conected with tension regulating links 64 whereby they are coupled with clip members 65 secured to the frame members 47. The sectors are provided with concentrically disposed slots 66 that terminate in shoulder portions 67, and 68 represents longitudinally disposed links having their front ends pivotally connected with the swinging levers 49 and their rear laterally turned ends received by the slots 66 and adapted to engage with the shoulder portions 67 in a manner to secure the swinging rear wall of the cock former in a closed position, and 69 represents tension springs connecting the bodies of the links at their front ends with the levers 49 in a manner to yieldingly hold the rear ends of the links in engagement with the shoulder portions 67 of the slotted sectors.

70 represents gravity actuated tripping members pivotally mounted upon a fixed part of the frame and adapted to engage with the links 68 in a manner to release them from the shoulder portions 67 when the levers 49 are swung rearward. The members 70 are prevented from downward movement by stops 70' carried by the frame members 56. 71 represents horizontally disposed frame bars upon opposite sides and at the lower end of the receiving chute, having their front ends secured to the inclined frame members 3 and their rear ends connected with the rear ends of the frame members 47 by means of supporting members 72, and 73 represents bars connecting the depending frame members 56 with the members 72. Slidably mounted upon the bars 71 are bracket members 74. Journaled in the brackets is a roller 75, carrying an apron 76, having one end secured to a transverse bar 77, having its opposite ends secured to the inclined frame members 3, the apron being wound upon the roller and having its opposite end secured thereto. The roller is provided with pinions 78 at its opposite ends that mesh with rack teeth 79 formed upon the lower edges of the bars 71. 80 represents vertically disposed bars having their lower ends secured to the arms 50 of the U-shaped movable cock ejecting member, and 81 brace members supporting the bars. The upper ends of the bars are connected with the slidable bracket 74 by means of links 82.

A portion of a tractor is shown including a truck frame member 83, a steering wheel 84, a steering mechanism 85, a traction wheel 86 mounted upon an axle 87, and a draft frame 88. Secured to the end of the axle 87 is a collar member 89 provided with oppositely disposed lugs 90 that are received by the clutch fork 19 in a manner to cause the sleeve 18 to rotate with the axle of the tractor. 91 represents a diagonally disposed draft rod having its rear end connected with an eye member 92 secured to the elevator frame and its front end provided with a hook whereby it is detachably connected with an eye member 93 secured to the front end of the truck frame 83 of the tractor, and 94 represents a laterally extending bracket member secured to the elevator frame and having its free end connected with the draft frame of the tractor by means of a pin 95.

The spur gear members 20 and 21, the sprocket wheels 24 and 26, and the sprocket wheels 27 and 29 are so proportioned as to rotate the raking cylinder 4 and the endless elevator carrier 9 at substantially the same peripheral speed as the traction wheels of the tractor, and the shaft 30 at a speed relative to the advance of the tractor as will cause the swinging levers 49 to move the cock ejector rearward at substantially the same speed as the tractor and cocker advance.

In operation, when the associated parts of the mechanism are in a position shown in full lines in Fig. 1, the crank arms 32 are on their forward dead centers and the pitmen 55 have turned the swinging levers 49 forward, thereby carrying the lower end of the inclined bar 52 of the cock ejector into engagement with the laterally extending arm 45 of the bracket member 44, thereby rocking the head 41 and fingers 43 into a receiving position. As the machine is drawn along a windrow by the tractor the raking cylinder 4 and the endless carrier 9 elevate the hay and deliver it into the downwardly converging chute, that directs it into the mouth of the receiving cage of the cock former. When the cage has been filled the operator manipulates the arm 40 in a manner to rock the shaft 39 in a direction to trip the clutch mechanism connecting the shaft 30 with the sprocket wheel 29 into engagement, thereby rotating the shaft and its crank arms 32 through one revolution. During the initial rotative movement of the crank arms the levers 49, carrying the links 68, swing rearward, and as the rear ends of the links are being disengaged by means of the tripping members 70 from the shoulder portions 67 of the sectors 61, the bar 52 of the cock ejector moves away from the arm 45 of the bracket member 44, permitting the head 41 to rock in its bearings and the rear ends of the fingers 43 to drop upon the ground in a trailing position. As the bar 52 moves rearward the hay is compressed in the cage by means of the rods $53^1$ until the links 68 are released from the controlling sector 61 carried by the swinging rear wall of the cage, and when that occurs the tension springs 63 react to quickly swing the wall rearward and upward to permit the cock to be ejected from the cage. The links 68 do not engage with the shoulders 67 on the sector 61 again until the levers 49 have been moved a predetermined part of their forward swing for the purpose of delaying the return of the rear wall of the cage to a closed position until it has moved away from the ejected shock. The levers 49, as they swing rearward to eject the cock, carry with them the bars 80 that are connected with the apron carrying brackets 74, and as the brackets move rearward upon the bars 71 the apron 76 is drawn from the roller 75, thereby closing the mouth of the cock former and retaining the incoming hay in the receiving chute, and upon a return movement of the levers the apron carrying roller is returned to its normal position, the pinions 78 engaging with the rack teeth 79 of the bars 71, rotating it in a reverse direction and winding the apron thereon. As the levers 49 and links 68 return to normal position, the tripping members 70, when engaged by the links 68, swing upwardly about their pivots to the dotted line position shown in Fig. 10 and return to their operative position after they swing past the ends of the links 68.

Having shown and described an embodiment of my invention, I do not desire that it be confined to the specific details of the structure as illustrated, it being understood that many changes may be made in the form, proportion and organization of the various parts without departing from the spirit of my invention as indicated in the appended claims.

What I claim as my invention, and desire to secure by Letters Patent, is:

1. In a machine of the class described, in combination, hay raking and elevating elements, a cock former adapted to receive the elevated material and including a rear wall, an intermittently operative cock compressor and ejector for discharging the cock from said former, and means for moving said rear wall, said last named means being set in operation after said ejector has moved rearwardly a predetermined distance.

2. In a machine of the class described, in combination, hay raking and elevating elements, a cock former adapted to receive the elevated material and including a pivoted rear wall, a clutch controlled cock compressor and ejector operative to discharge a cock from said former, and means controlled by said ejector for swinging said rear wall on its pivot, said last named means being set in operation after said ejector has moved a predetermined distance.

3. In a machine of the class described, in combination, hay raking and elevating elements, a cock former adapted to receive the elevated material and including a tiltable bottom having an offset portion, a cock ejector normally engaging said offset portion and holding said bottom in raised position said cock ejector being movable across said bottom and operative to discharge a cock, and said bottom being released by the initial movement of said ejector.

4. In a machine of the class described, in combination, hay raking and elevating elements, a cock former adapted to receive the elevated material and including relatively stationary side walls, a pivoted rear end wall, a movable front wall, and means for intermittently actuating said front wall in a manner to eject a cock from said former.

5. In a machine of the class described, in combination, a frame, hay raking and elevating elements carried thereby, a cock former adapted to receive the elevated material, and a flexible movable apron secured at one end to said frame and operative to receive the material discharged by said elevating elements when said cock is being ejected.

6. In a cock former, a movable rear wall, a cock compressor and ejector, means for moving said rear wall, and means set in operation after said ejector has moved a predetermined distance for releasing said rear wall moving means whereby initial movement of said ejector will compress the cock between said ejector and said rear wall.

7. In a machine of the class described, in combination, hay raking and elevating mechanism including an elevator frame, a cock former carried by said elevator frame and terminating at its upper end in a receiving chute adapted to receive material from said elevating mechanism, a movable cock ejector forming part of said former, and an apron adapted to be drawn across the delivery end of said chute and actuated by said cock ejector to close the delivery end of said chute as the cock is being ejected.

8. In a machine of the class described, in combination, hay raking and elevating elements, a cock former adapted to receive the elevated material, said former including a tiltable bottom, a movable clutch controlled front wall, and means whereby a movement of said front wall controls the operation of said tiltable bottom.

9. In a machine of the class described, in combination, an upwardly and rearwardly inclined elevator frame, hay raking and elevating elements carried by said frame, a cock former carried by said frame and adapted to receive material from the delivery end thereof, said cock former including a tiltable bottom pivotally connected with said elevator frame, relatively fixed side walls, and a movable front wall, said front wall controlling the tilting action of said bottom.

10. In a machine of the class described, in combination, an upwardly and rearwardly inclined elevator frame, hay raking and elevating elements carried by said frame, a cock former carried by said elevator frame and adapted to receive material from the delivery end thereof, said cock former including a tiltable bottom pivotally connected with said elevator frame, relatively fixed side walls, a pivoted rear wall, a front wall movable longitudinally relative to the line of draft, means for actuating said front wall, and operative connections between said pivoted rear wall and said front wall actuating means.

11. In a machine of the class described, in combination, an upwardly and rearwardly inclined elevator frame, hay raking and elevating elements carried by said frame, a cock former carried by said elevator frame and adapted to receive material from the delivery end thereof, said cock former including a tiltable bottom pivotally connected with said elevator frame, relatively fixed side walls, a front wall movable longitudinally relative to the line of draft, means for actuating said front wall to eject a cock, a transversely disposed rock shaft, a rear wall depending from said rock shaft, and operative connections between the opposite ends of said rock shaft and said means for actuating said front wall.

12. In a machine of the class described, in combination, an upwardly and rearwardly inclined elevator frame, hay raking and elevating elements mounted upon said frame, a cock former carried by said elevator frame and adapted to receive material from the delivery end thereof, said cock former including a tiltable bottom, relatively fixed side walls, a hinged rear wall, a cock ejector normally disposed at the front side thereof, pendulum levers upon opposite sides of said elevator frame having one end pivotally connected with said elevator frame and their opposite ends with said ejector, and intermittently operative means for swinging said levers to discharge a cock.

13. In a machine of the class described, in combination, an upwardly and rearwardly inclined elevator frame, hay raking and elevating elements mounted upon said frame, a cock former carried by said elevator frame and adapted to receive material from the delivery end thereof said cock former including a tiltable bottom, relatively fixed side walls, a hinged rear wall, a cock ejector normally disposed at the front side thereof, pendulum levers upon opposite sides of said elevator frame having one end pivotally connected with said elevator frame and their opposite ends with said ejector, and means for swinging said levers, said means including a transversely disposed shaft journaled in bearings carried by said elevator frame, crank arms secured to opposite ends of said shaft, pitmen connecting said crank arms with said levers, and operative connections between said shaft and said hay raking and elevating elements, said connections including intermittently operating clutch mechanism.

14. In a machine of the class described, in combination, an upwardly and rearwardly inclined elevator frame, hay raking and elevating elements mounted upon said frame, a cock former carried by said elevator frame and adapted to receive material from the delivery end thereof, said cock former including a tiltable bottom, relatively fixed side walls, a hinged rear wall, and a cock ejector normally disposed at the front side thereof, pendulum levers upon opposite sides of said elevator frame having one end pivotally connected with said frame and their opposite ends with said ejector, tension springs reactive to turn said hinged rear wall to an open position at predetermined intervals, and links carried by said pendulum levers intermediate their ends operative to close said hinged wall.

15. In a machine of the class described, in combination, an upwardly and rearwardly inclined elevator frame, hay raking and elevating elements mounted upon said frame, a cock former carried by said elevator frame and adapted to receive material from the delivery end thereof, said cock former including a tiltable bottom pivotally connected with said elevator frame, relatively fixed side walls, a front wall movable longitudinally relative to the line of draft, pendulum levers upon opposite sides of said elevator frame having one end pivotally connected with said frame and their opposite ends with said front wall, intermittently operative connections between said levers and said raking and elevating elements, a transversely disposed rock shaft, a rear wall depending from said rock shaft, sector levers secured to opposite ends of said rock shaft, tension springs connecting said sector levers with said elevator frame, and tilting links connecting said pendulum levers with said sector levers.

16. In a machine of the class described, in combination, an upwardly and rearwardly inclined elevator frame, hay raking and elevating elements mounted upon said frame, means for transmitting motion to said elements, said means including a laterally extending stub shaft secured to said frame, a sleeve journaled upon said shaft and operatively connected with the hay raking and elevating elements, said sleeve being provided with clutch elements upon its outer end whereby it may be connected with a source of draft and driving power.

17. In a machine of the class described, in combination, an upwardly and rearwardly inclined elevator frame, a raking cylinder and an endless carrier mounted upon said frame, means for transmitting motion to said cylinder and endless carrier, said means including a laterally extending stub shaft secured to said frame, a sleeve journaled upon said shaft, a pinion integral with said sleeve, a second shaft secured to said frame, a sprocket wheel and pinion journaled upon said second shaft, a second sprocket wheel carried by said raking cylinder, and a clutch element upon the outer end of said sleeve whereby it may be connected with a source of draft and driving power.

18. In a machine of the class described, a cock former including movable front and rear walls, means for moving said front wall, and mechanism controlled by said means for moving said rear wall more rapidly than said front wall.

19. In a machine of the class described, a cock former including movable front and rear walls, means for moving said front wall, resilient means for moving said rear wall, and latching mechanism normally holding said rear wall in closed position and controlled by said front wall moving means.

20. In a machine of the class described, a cock former including a movable front wall and a pivoted rear wall, means for moving said front wall, resilient means for swinging said rear wall on its pivot, means normally retaining said rear wall in closed position, and means operatively connected to said front wall moving means for releasing said retaining means.

In testimony whereof I affix my signature.

EDWARD W. BURGESS.